Figure 1:
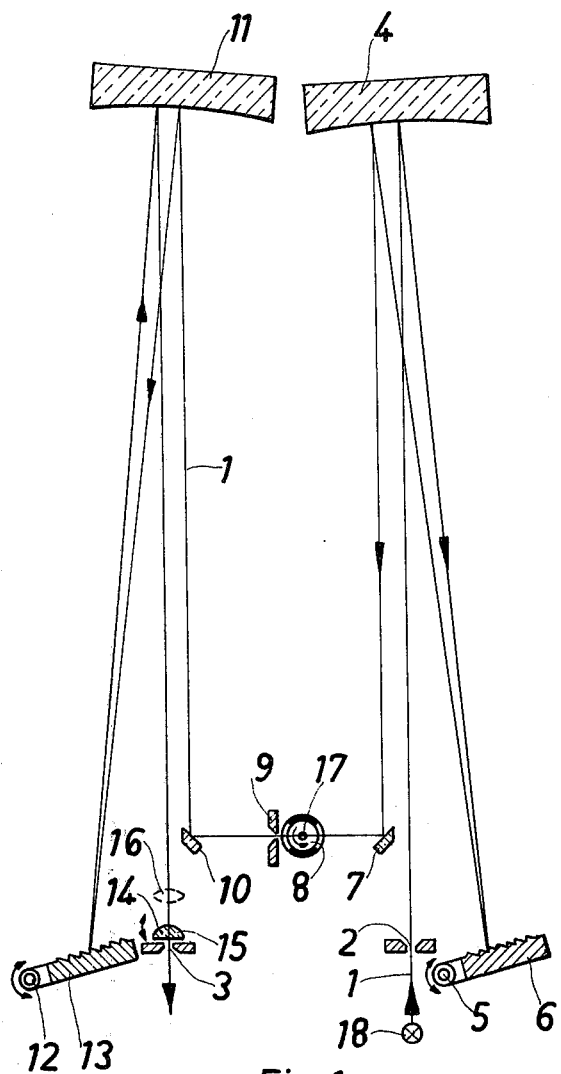

United States Patent [19]
Winter

[11] B 3,915,571
[45] Oct. 28, 1975

[54] MONOCHROMATOR WITH ROTATABLE LENS

[75] Inventor: Ernst Winter, Jena, Germany

[73] Assignee: Jenoptik Jena G.m.b.H., Jena, Germany

[22] Filed: Dec. 20, 1972

[21] Appl. No.: 320,603

[44] Published under the Trial Voluntary Protest Program on January 28, 1975 as document no. B 320,603.

[52] U.S. Cl., ................................ 356/100; 356/101
[51] Int. Cl.² .......................................... G01J 3/12
[58] Field of Search ...................... 356/99, 100, 101

[56] References Cited
UNITED STATES PATENTS
2,339,053  1/1944  Coleman ........................... 356/101

Primary Examiner—Vincent P. McGraw

[57] ABSTRACT

A monochromator is adapted to single out a definite narrow spectral range from a light source.

Said monochromator comprises a light entrance slit and a light exit slit, an intermediate optical system for imaging the light-entrance slit on the light exit slit, an adjustable dispersion means for displacing the image of the light entrance slit in the plane of the light exit slit, and a lens located in the proximity of one of the monochromator slits. Said lens is rotatable as a function of the wavelength around an axis, which is at right angles to the light entrance slit and serves for congruently imaging the light entrance slit on the light exit slit.

The rotations of the lens and the tilting of the dispersion means can be effected by a common drive mechanism.

Furthermore, the rotatable lens may be in cooperation with a non-rotatable lens.

The monochromator is adapted to operate in double monochromators.

3 Claims, 2 Drawing Figures

U.S. Patent  Oct. 28, 1975  3,915,571

MONOCHROMATOR WITH ROTATABLE LENS

This invention is concerned with improvements in a monochromator comprising a light entrance slit and a light exit slit, an intermediate optical system for imaging said light entrance slit onto said light exit slit, an adjustable dispersion member adapted to displace the light entrance slit image in the plane of the light exit slit in dependence of the wavelengths, and further comprising a lens inserted into the path of rays in the vicinity of one monochromator slit.

Such spectral devices area adapted to single out a narrow spectral range from the spectrum of a radiant source. With a given dispersion member and a given radiant source the magnitude of the radiant flux emitted by a monochromator substantially depends on the relation between the slit length and the focal length of the monochromator, furthermore from the congruency between the image of the light entrance slit and the light exit slit.

In order to obtain an intense radiant flux, it is desireable to have long slits in monochromators in accordance with the form of the light source and in accordance with the applied optical system. Owing to aberrations inherent in the imaging system and due to undesired influences from the dispersion members, it is difficult to obtain the necessary constant resolution of the imaged light entrance slit and to have congruency between the imaged entrance slit and the exit slit (spectral line) at all set wavelengths or wave numbers. Thus, in previous devices the light exit slit had been designated as a bent line to obtain accordance with the light entrance slit at a definite wavelength. Thus, the complete resolution power of a monochromator is only effective in the narrow range of a definite spectral line. With the heretofore known Fastie-Ebert plane grating monochromators, the bend of the spectral lines is in register with the bend of the exit slit, independent from the selected wavelength. Such a monochromator is well suited for obtaining congruency between the imaged entrance slit and the exit slit, however, the aperture of said monochromator lies within definite limits, because the incorporated imaging system is not corrected for aberration. Furthermore, said plane grating monochromator is comparatively bulky, which is a serious drawback in the case of constructing double monochromators.

In addition thereto, the use of two concave reflectors involves comparatively large expenditures. Any enlarged or reduced image of the spectral line on the exit slit, includes some difficulties when line shaped radiant sources are utilized and imaged.

The same difficulties are involved if the bend of a curved slit is comparatively strong. A further more recent monochromator is corrected for coma, yet does not ensure independence of the wavelength from the bend of the spectral line. A further known monochromator uses a non-spherical lens to correct for aberrations. Said lens is located in greater proximity to the exit slit than to the entrance slit and is rotated relative to the grating axis. The monochromator in question is of poor precision, having the grating not arranged within the parallel path of rays, for which reason said lens serves to correct for image aberrations, whereas the lens arrangement is not suited for correcting the image of the spectral line configuration relative to the exit slit, in dependence of the adjusted wavelength.

It is an object of the present invention to increase the measuring precision. It is a further object to provide a compact monochromator in which the entrance slit of any length is congruently imaged on the exit slit, without limiting the aperture relations of the monochromator.

Accordingly, this invention concerns a monochromator comprising a light entrance slit, a light exit slit, an intermediate optical system for imaging said light entrance slit on said light exit slit, an adjustable dispersion means adapted to displace the image of the light entrance slit in the plane of the light exit slit in dependence both of the wavelength and a lens arranged within the path of rays near to the light exit slit, wherein said lens is rotatable around an axis parallel to the light entrance slit in dependence from the wavelength of the analyzed light. The inventional arrangement permits in a simple way the adaptation of the spectral line configuration to the exit slit. Preferably, the means for adjusting the dispersion member and the lens rotating means are coupled to one another, thus combinedly rotating the lens and the wavelength, respectively, wave-number-adjusting-means by an adequate amount, which ensures a precision imaging of the light entrance slit on the light exit slit. By suitably selecting the lens radius the angles of rotation of both lens and dispersion member can be adapted to each other.

Concerning the lens, this can be constructed spherically, or non-sperically, or cylindrically. In the case of the lens being directly arranged in front of the light exit slit, it can at the same time be utilized as a field lens for imaging a grating on a photo-detector. If the transmission ratio between the rotations of the lens and dispersion member is optional, the lens radius may be adapted to other requirements. In particular the lens may be so dimensioned as to effect image flattening in certain monochromator types.

Under employment of two lenses, a fixed one and a rotatable one, both conditions, namely the synchronism of the rotations of the lens and the dispersion member, and the image flattening can be satisfied. This is the case if, for example, the curvature of the image flattening lens is too small in order to effect congruency between entrance slit and exit slit with a reasonable amount of rotation.

Figure 2:
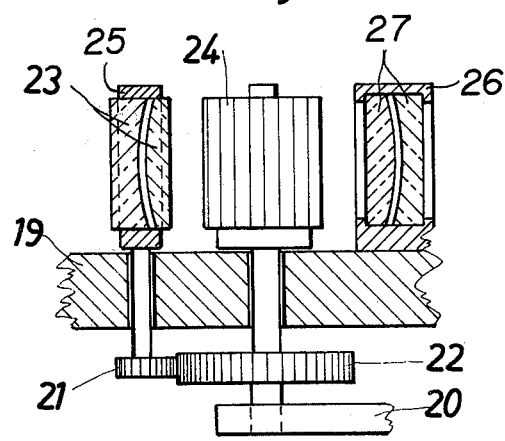

In order that the invention may be more readily understood reference is made to the accompanying drawings which illustrate diagrammatically and by way of example one embodiment thereof and in which FIG. 1 shows the optical design of a grating double monochromator and FIG. 2 the means effecting coupling between lens rotation and dispersion element.

Referring now in more detail to FIG. 1, a first imaging concave mirror 4, a first grating 6 rotatable around an axis 5, a first deviating plane mirror 7, a modulator 8 rotatable around an axis 17, a centre slit 9, a second plane deviating mirror 10, a second concave mirror 11, a second grating 13 rotatable around an axis 12, and a lens 15 rotatable around an axis 14, parallel to a light exit slit 3, are successively arranged in a light path 1 and between a light entrance slit 2 and said light exit slit 3. Said centre slit 9 represents the exit slit in respect to the monochromator defined by the members 2; 4; 6; 7, and the entrance slit in respect to the monochromator defined by the members 10; 11; 13; 15; 3. Said lens 15 can cooperate with a non-rotatably mounted lens 16.

The axes 5, 12, 14, 17, shown in this embodiment are parallel to one another and at right angles to the drawing plane. A bundle of light, embodied by a beam 1, originates from a light source 18; said beam 1 passes the light entrance slit 2, arranged in the object side focal plane of the concave mirror 4, on which it impinges as divergent light for being reflected as parallel light on to a dispersion grating 6, which both spectrally disperses and reflects the impinging light back to the concave mirror 4. Said concave mirror 4 produces a line spectrum via the deviating mirror 7 at the position of the centre slit 9 in its image side focal plane. Said line spectrum in turn is modulated by a modulator 8. The centre slit 9 disphragms out a line or a narrow range from said spectrum.

The image side focal plane of the concave mirror 4 is at the same time the object side focal plane of a concave mirror 11, which parallels the diverging light emanating from the centre slit 9. The parallel light is reflected onto the dispersion grating 13, which once more spectrally disperses the imaging light, for being back reflected to the concave mirror 11. The light exit slit 3 is arranged in the image side focal plane of the concave mirror 11. A spectrum of the light, arriving via the centre slit 9 from the first monochromator to the second monochromator, is imaged through the lenses 16 and 14 on said light exit slit 3. In this manner, the effects from stray-light are substantially suppressed and monochromator light of a high spectral distinctness leaves the double monochromator system.

In order to focus the different spectral wavelengths, the gratings 6 and 13 are mounted rotatably around axes 5 and 12, respectively, thus the spectral line which appears at the light exit slit 3, is varied in respect to the wavelength and to its configuration relative to the light exit slit.

In order to obtain identical spectral line configurations at the entrance and at the exit, the lens 15 is rotated around the axis 14 in accordance with the rotations of the gratings.

Furthermore, lens 15 in cooperation with the nonrotatable lens 16 is adapted for image field flattening. In FIG. 2 a drive gear 22 and a drive gear 21 are rotatably mounted in a part of a housing 19. A cylindrical lens pair 23 and said driven gear 21 are in rigid connection, so are a reflecting dispersion grating 24 and said drive gear 22. When rotating said dispersion grating 24 by means of a lever 20, the gear 21 is consequentially forced into rotation, and therewith said cylindrical lens pair 23 in a mount 25, thus correcting the shape of the spectral line. Apart therefrom, a mount 26 encompassing a lens pair 27 is secured to the housing 19.

The invention is also applicable for prismatic monochromators, and is not restricted to the optical embodiment of a monochromator as hereinbefore described.

I claim:
1. A monochromator comprising
   a light source,
   a light entrance slit,
   a light exit slit,
   an optical system for imaging said light entrance slit on said light exit slit,
   an adjustable dispersion means adapted to substantially displace at right angles the image of said light entrance slit in the plane of and relative to said light exit slit as a function of the wave length of the analyzed light,
   a lens positioned in the proximity of one of said slits, said lens being rotatable around an axis, being in turn parallel to said light entrance slit for attaining congruency between the image of said light entrance slit and said light exit slit,
   said optical system, said adjustable dispersion means and said lens being arranged between said entrance slit and said exit slit and being in optical alignment with each other, and with the entrance slit and the exit slit,
   a first mechanical means for displacing said dispersion means and a second mechanical means adapted to rotate said lens.
2. A monochromator as claimed in claim 1, wherein a coupling is provided between said first and said second mechanical means.
3. A monochromator as claimed in claim 1, wherein said rotatable lens cooperates with a non-rotatable lens being located on that side of the rotatable lens which is turned off the light exit slit.

* * * * *